United States Patent [19]
Howell et al.

[11] Patent Number: 5,912,673
[45] Date of Patent: Jun. 15, 1999

[54] GRAPHICAL IMAGE CONVOLUTION USING MULTIPLE PIPELINES

[75] Inventors: Stephen K. Howell, Santa Clara; Jaijiv Prabhakaran, Sunnyvale, both of Calif.

[73] Assignee: Sun Microsystems, Inc., Palo Alto, Calif.

[21] Appl. No.: 08/563,085

[22] Filed: Nov. 27, 1995

[51] Int. Cl.$^6$ .................................................. G06T 5/00
[52] U.S. Cl. ............................................................ 345/433
[58] Field of Search ........................... 395/128, 129–133, 395/135, 141, 523, 524; 382/151, 205, 266–269, 279, 282, 260–265; 345/428–435

[56] References Cited

U.S. PATENT DOCUMENTS

| | | | |
|---|---|---|---|
| 5,228,126 | 7/1993 | Marianetti, II | 395/162 |
| 5,604,819 | 2/1997 | Barnard | 382/151 |
| 5,628,025 | 5/1997 | Chung et al. | 395/800.09 |

FOREIGN PATENT DOCUMENTS

| | | | |
|---|---|---|---|
| 0 267 967 A1 | 5/1988 | European Pat. Off. | G06F 15/66 |
| 0 619 551 A2 | 10/1994 | European Pat. Off. | G06F 15/70 |
| 0 775 979 A2 | 5/1997 | European Pat. Off. | G06T 5/20 |

OTHER PUBLICATIONS

Geenley, et al. "UltraSPARC$^{(TM)}$: The Next Generation Superscalar 64–bit SPARC," Digest of Papers of the Computer Society Computer Conference (Spring) Compcon, Technologies for the Information Superhighway, San Francisco, Mar. 5–9, 1995, No. CONF.40, pp. 442–451.

Kohn, et al. "The Visual Instruction Set (VIS) in Ultrasparc™," Digest of Papers of the Computer Society Computer Conference (Spring) Compcon, Technologies for the Information Superhighway, San Francisco, Mar. 5–9, 1995, No. CONF. 40, pp. 462–469.

Denayer, et al. "A Class of Multiprocessors for Real–Time Image and Multidimensional Signal Processing," IEEE Journal of Solid–State Circuits, vol. 23, No. 3, Jun. 1, 1988, pp. 630–638.

*Primary Examiner*—Almis R. Jankus
*Attorney, Agent, or Firm*—James D. Ivey

[57] ABSTRACT

A parallel processor which is capable of partitioned multiplication and partitioned addition operations convolves multiple pixels in parallel. The parallel processor includes a load and store pipeline of a load and store unit which retrieves data from and stores data to memory and one or more arithmetic processing pipelines of an arithmetic processing unit which aligns data and performs partitioned multiplication and partitioned addition operations. A patch of pixels from a source image are convolved substantially simultaneously in the arithmetic processing pipeline of the processor by execution of the partitioned multiplication and partitioned addition operations. At substantially the same time, a subsequent patch of pixels from the source image are read by the load and store unit of the processor. The subsequent patch of the source image is a patch which is aligned with respect to a secondary index and is incremented along a primary index to avoid excessive cache misses when retrieving pixel data for convolution. Reading of pixel data is performed in the load and store pipeline of the processor while the arithmetic processing pipeline substantially simultaneously performs partitioned arithmetic operations on the pixel data to thereby convolve the pixel data.

17 Claims, 8 Drawing Sheets

GRAPHICAL IMAGE CONVOLUTION USING MULTIPLE PIPELINES

FIELD OF THE INVENTION

The present invention relates to graphical image processing in a computer system and, in particular, to a particularly efficient convolution mechanism implemented in a computer having a processor capable of performing multiple arithmetic operations simultaneously and in parallel.

BACKGROUND OF THE INVENTION

Convolution is a type of image processing and is used, for example, to blur or sharpen graphical images or to enhance edges in a graphical image. Convolution is well-known but is described briefly for completeness. Generally, a source image is convolved to produce a resulting image. Each pixel of the resulting image is a weighted combination of a corresponding pixel of the source image and pixels in proximity to the corresponding pixel of the source image. For example, to convolve a pixel at the center of a matrix of pixels of three rows by three columns, each of the pixels of the matrix is multiplied by a corresponding scalar coefficient of a convolution matrix having three rows by three columns of coefficients and the resulting products are summed to produce a pixel in the resulting image.

The particular coefficients of the convolution matrix determine the particular effect on the source image of the convolution. For example, if coefficients near the center of the convolution matrix are relatively small and coefficients far from the center of the convolution matrix are relatively large, the source image is blurred in the resulting image. If the coefficient at the center of the convolution matrix is relatively large and coefficients near but not at the center are relatively small and negative, the source image is sharpened.

Convolution of a graphical image requires substantial resources. For example, even using a relatively small convolution matrix which has only three rows and three columns of scalar coefficients requires nine (9) multiplication operations and eight (8) addition operations for each pixel. In addition, nine (9) read operations are required to obtain a three-row by three-column matrix of pixels from the source image. Graphical images typically include a rectangular grid of pixels and can be as large as one thousand or more columns of one thousand or more rows of pixels. Thus, source images having as many as one million or more pixels are convolved. Furthermore, pixels of color graphical images typically have three (3) components, namely, red, green, and blue. To convolve a color image, each component of the color image must be convolved. Each component is typically convolved independently of other components. Thus, convolution of a large color source image can involve as many as 27 million read operations, 27 million multiplication operations, 24 million addition operations, and 27 million store operations. Accordingly, some conventional convolution systems require as many as 105 million instruction cycles to convolve a color graphical image having one million pixels using a colvolution matrix having three columns and three rows. Convolution involving larger convolution matrices, e.g., matrices which have five rows and five columns of scalar coefficients or matrices which have seven rows and seven columns of scalar coefficients, require considerably more processing.

Because of the substantial computer resources required to convolve graphical images, a need for ever increasingly efficient convolution systems persists in the industry.

SUMMARY OF THE INVENTION

In accordance with the present invention, a processor which is capable of performing partitioned multiplication and partitioned addition operations convolves multiple pixels in parallel. The processor includes a load and store pipeline of a load and store unit which retrieves data from and stores data to memory and one or more arithmetic processing pipelines of an arithmetic processing unit which aligns data and performs partitioned multiplication and partitioned addition operations. A number of pixels from a source image, which collectively are a patch of pixels, are convolved substantially simultaneously in the arithmetic processing pipeline of the processor by execution of the partitioned multiplication and partitioned addition operations. At substantially the same time, a subsequent patch of pixels from the source image are read by the load and store unit of the processor. The source image is a graphical image prior to convolution of the graphical image. A patch is generally a rectangular grid of spatially contiguous pixels of the source image. Convolution of the source image requires convolution of a number of patches of the source image in sequence. A subsequent patch is a patch which is convolved substantially immediately subsequent to the most recently convolved patch of the source image.

The subsequent patch of the source image is a patch which is aligned with respect to a secondary index and is incremented along a primary index to avoid excessive cache misses when retrieving pixel data for convolution. Ordinarily, incrementing along the primary index rather than along the secondary index results in redundant reading and alignment of pixel data. However, in accordance with the present invention, reading of pixel data is performed in the load and store pipeline of the processor while the arithmetic processing pipeline substantially simultaneously performs partitioned arithmetic operations on the pixel data to thereby convolve the pixel data. As a result, redundant reading of data does not slow the convolution of pixel data while cache misses are substantially reduced over conventional convolution mechanisms.

The substantially simultaneous reading and convolving of pixel data in parallel pipelines of the processor and the selecting of subsequent patches along the primary index of the pixel data to minimize cache misses achieve a degree of efficiency in convolution of graphical images not yet achieved in the prior art.

DETAILED DESCRIPTION

Figure 1:
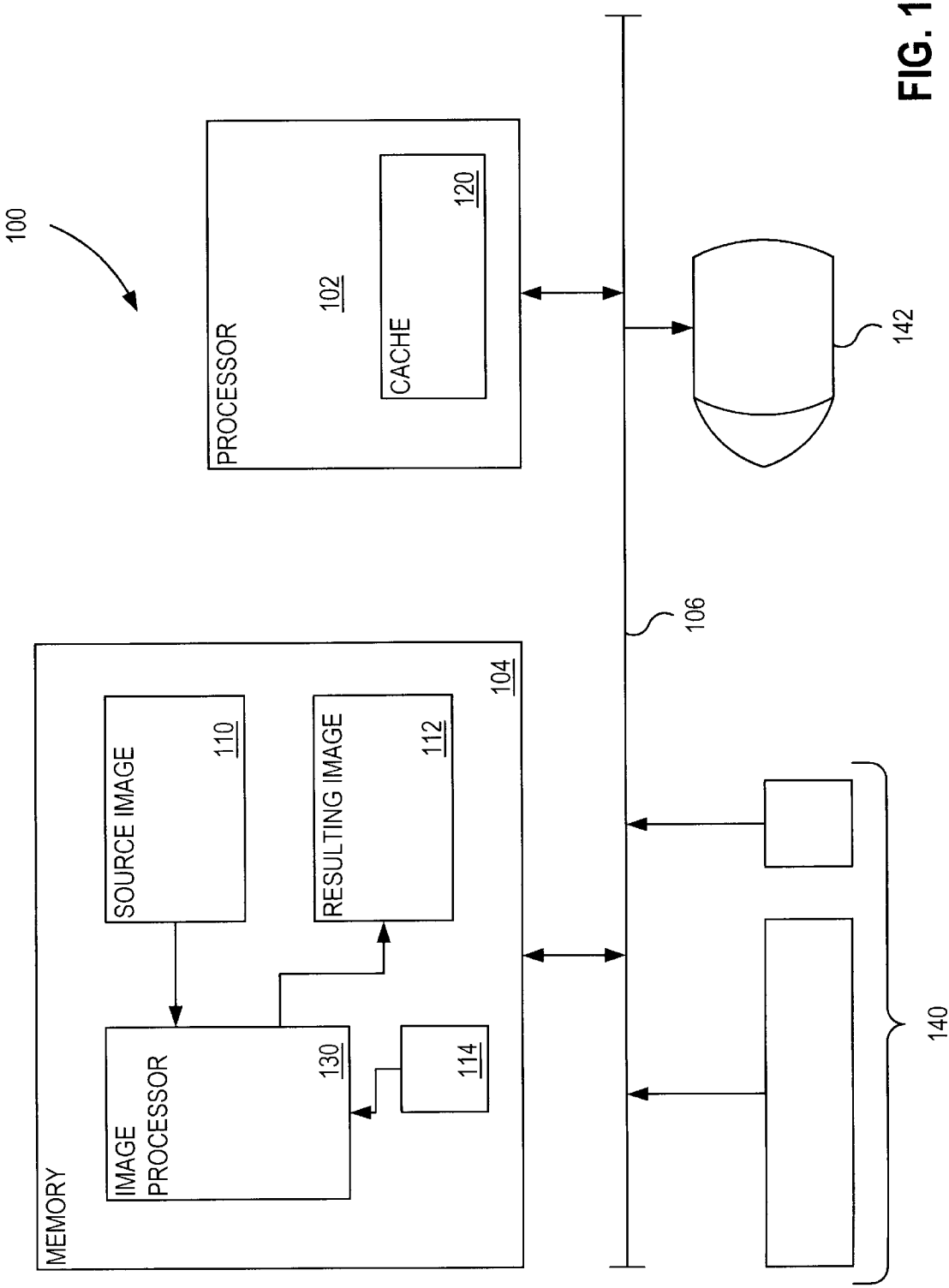
FIG. 1 is a block diagram of a computer system which includes an image processor in accordance with the present invention.

In accordance with the present invention, multiple pipelines through a parallel processor are used in a novel manner to more efficiently convolve a source image 110 (FIG. 1) to produce a resulting image 112. A computer system 100 within which source image 110 is convolved is generally of the structure shown. Computer system 100 includes a processor 102 which is coupled to a memory 104 through a bus 106. Processor 102 is described in greater detail below and (i) fetches from memory 104 and executes computer instructions and (ii) reads data from and writes data to memory 104 in accordance with the fetched and executed instructions.

Processor 102 includes a cache memory 120 in which data and/or instructions previously retrieved from memory 104 are stored. Accessing data in memory 104 requires approximately 20 cycles of the clock signal of processor 102, and accessing data in cache memory 120 requires approximately 2 to 3 cycles of the clock signal of processor 102. Therefore, to retrieve data from memory 104, processor 102 first determines whether a copy of the data is stored in cache memory 120 and, if so, retrieves the data from cache memory 120 rather than from memory 104. Retrieving data from cache memory 120 rather than from memory 104 is generally called a cache hit. Determining that no copy of the data is stored in cache memory 120 and retrieving the data from memory 104 is generally called a cache miss.

Memory 104 can include generally any type of memory, including without limitation randomly accessible memory (RAM), read-only memory (ROM), and secondary storage including storage media such as magnetic and optical storage devices. Stored within memory 104 are (i) source image 110, (ii) resulting image 112, and (iii) a convolution matrix 114. In addition, an image processor 130 is a computer process which executes within processor 102 from memory 104. Image processor 130, in a manner described more completely below, (i) reads pixel data from source image 110, (ii) convolves the pixel data using convolution matrix 114 to produce new pixel data, and (iii) stores the new pixel data in resulting image 112.

In accordance with computer instructions fetched from memory 104 and executed by processor 102, processor 102 receives from one or more input devices 140 command signals generated by a user and sends to computer display device 142 display data and control signals. Each of input devices 140 can be any computer input device, including without limitation a keyboard, a keypad, or a pointing device such as a trackball, an electronic mouse, thumbwheels, a lightpen, or a digitizing tablet. Computer display device 142 can include any type of computer display device, including without limitation a cathode ray tube (CRT), a light-emitting diode (LED) display, or a liquid crystal display (LCD). Image processor 130 sometimes prompt a user to select particular characteristics or individual coefficients of convolution matrix 114 and establishes specific values of the coefficients of convolution matrix 114 in response to control signals received through processor 102 from input devices 140. Image process 102, after convolving source image 110 to produce resulting image 112, displays resulting image 112 in computer display device 142 to display to the user resulting image 112.

Figure 2:
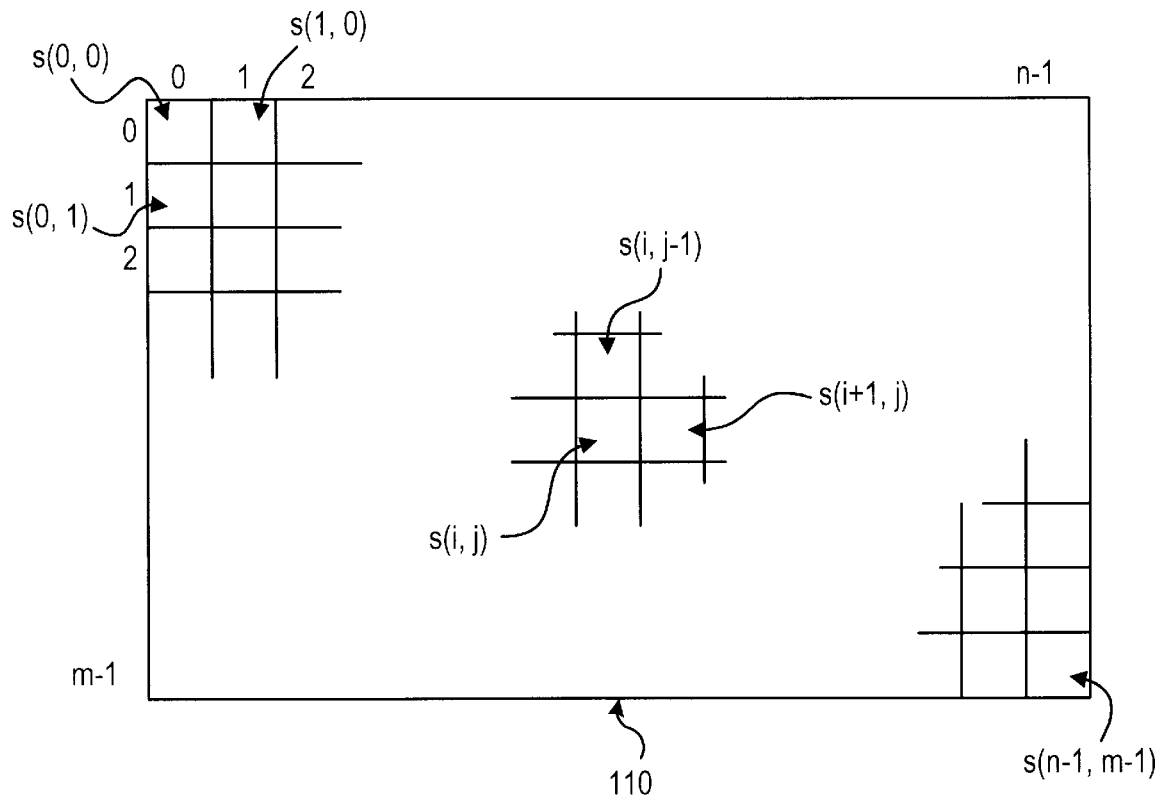
FIG. 2 is a diagram of the source image of FIG. 1 in greater detail.

Source image 110 is shown in greater detail in FIG. 2. Source image 110 is a rasterized image, i.e., is generally a rectangular grid of pixel data. Each pixel of source image 110 is represented by a single instance of pixel data which represent pixels of source image 110 and which are logically organized as a rectangular grid as shown. In one embodiment, each pixel is represented by a single byte. Source image 110 can be an entire greyscale graphical image or can be a component, i.e., red, green, or blue, of a color graphical image. While source image 110 is shown as a rectangular grid of pixel data, source image 110 is stored sequentially. Specifically, source image 110 has a primary index and a secondary index. For example, source image 110 has a primary index which is used to specify the horizontal component of the location of a particular pixel, and a secondary index which is used to specify the vertical component of the location of the pixel. Herein, a particular pixel in source image 110 is referred to as s(i,j) in which i refers to a particular value of the primary index and j refers to a particular value of the secondary index. For example, s(i,j) can refer to a pixel of source image 110 at the $i^{th}$ column and the $j^{th}$ row. A rectangular block of pixels of source image 110 having minimum and maximum primary index values of a and b, respectively, and minimum and maximum secondary index value of c and d, respectively, is sometimes represented herein as s(a..b,c..d). Similarly, a particular pixel in resulting image 112 is referred to as r(i,j) in which i refers to a particular value of the primary index and j refers to a particular value of the secondary index. A rectangular block of pixels of resulting image 112 having minimum and maximum primary index values of a and b, respectively, and minimum and maximum secondary index value of c and d, respectively, is sometimes represented herein as r(a..b,c..d).

Source image 110 is stored as a sequence of pixel data corresponding to the following locations in the following order: s(0,0), s(1,0), s(2,0), . . . s(i−1,0), s(i,0), s(i+1,0), . . . s(n−1,0), s(0,1), s(1,1), . . . s(n−1,j), s(0,j+1), . . . s(n−1,m−1). The entirety of source image 110 is alternatively represented by the notation s(0..n−1,0..m−1). The number of pixels along the direction of the primary index, e.g., the number of columns, of source image 110 is n, and the number of pixels along the direction of the secondary index, e.g., the number of rows, of source image 110 is m. A few observations above the particular order of the pixels in source image 110 should be noted. First, a pixel s(i+1,j) is stored in memory 104 at a location which immediately follows the location of pixel s(i,j). Second, a pixel s(0,j+1) is stored in memory 104 at a location which follows the location of pixel s(n−1,j) relatively closely and can immediately follow the location of pixel s(n−1,j). In some instances, a few bytes of "pad" data are inserted between pixel s(n−1,j) and pixel s(0,j+1) to enhance performance, e.g., to ensure that pixel s(0,j+1) is aligned with an eight-byte boundary. However, such pad data is usually short in length relative to the length of a line of pixel data corresponding to a particular value of the secondary index, i.e., is substantially less than n bytes in length. Third, a pixel s(i,j+1) is stored in memory 104 at a location which is generally n memory locations, plus any memory locations occupied by pad data, following the location of pixel s(i,j). Thus, each horizontal line of source image 110 is stored as a contiguous sequence of pixel data and the contiguous horizontal lines are stored substantially contiguously end-to-end such that the last pixel of a horizontal line is followed substantially immediately by the first pixel of the next horizontal line. Resulting image 112 (FIG. 1) is directly analogous to source image 110 and is therefore equally accurately represented by FIG. 2.

Figure 3:
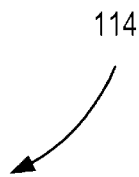
FIG. 3 is a diagram of the convolution matrix of FIG. 1 in greater detail.
Figure 4:
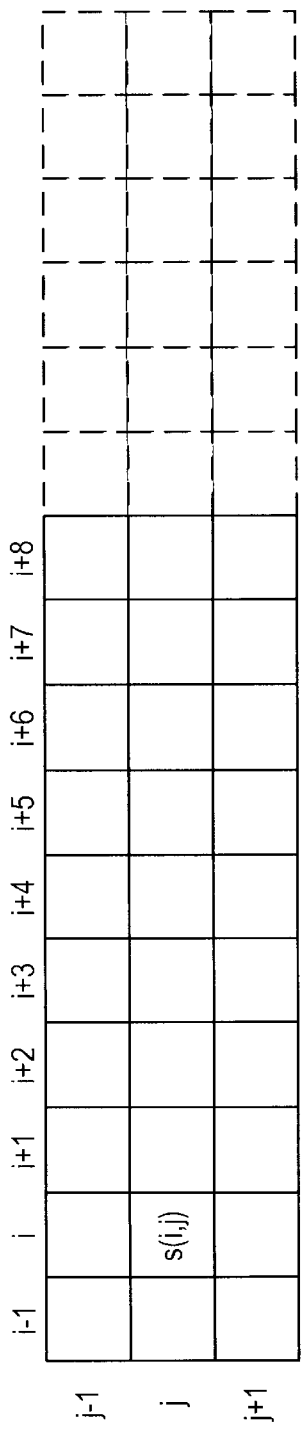
FIG. 4 is a diagram illustrating a patch of pixel data retrieved from the source image of FIGS. 1 and 2.

Convolution matrix 114 (FIG. 1) is shown in greater detail in FIG. 3. Convolution matrix 114 has three rows and three columns of scalar coefficients $k_1$, $k_2$, $k_3$, $k_4$, $k_5$, $k_6$, $k_7$, $k_8$, and $k_9$. In response to computer instructions of image processor 130 (FIG. 1) so directing, processor 102 performs partitioned arithmetic operations, e.g., (i) a partitioned multiplication operation in which a sixteen-bit fixed-point operand of a partitioned lower or upper half of a 32-bit word is multiplied by four (4) partitioned eight-bit integer operands of a 32-bit word simultaneously and in parallel to produce four (4) partitioned sixteen-bit fixed-point products and (ii) a partitioned addition operation in which four partitioned sixteen-bit fixed-point operands of a 64-bit word are added to four (4) respective partitioned sixteen-bit fixed-point operands of a second 64-bit word. Thus, to take advantage of the partitioned operations performed by processor 102, image processor 130 convolves eight (8) pixels of source image 110 are convolved simultaneously. When executed by processor 102, image processor 130 reads a patch 110P (FIG. 4) of ten (10) pixels by three (3) pixels to produce eight (8) pixels in resulting image 112.

The dimensions of patch 110P are determined by the number of pixels to be convolved at once and the size of convolution matrix 114. In general, the size of patch 110P is one less than the sum of the number of pixels to be convolved at once and the width of convolution matrix 114 in the direction of the primary index and the height of convolution matrix 114 in the direction of the secondary index. For example, if sixteen pixels are to be convolved at once using a convolution matrix which has five columns and five rows, patch 110P would include a rectangular area of pixels having 20 pixels in the direction of the primary index and five pixels in the direction of the secondary index.

The eight (8) pixels r(i..i+7,j) are convolved from patch 110P, i.e., pixels s(i−1..i+8,j−1..j+1) according to the following equations.

$$r(i, j) = k_1 \cdot s(i-1, j-1) + k_2 \cdot s(i, j-1) + \\ k_3 \cdot s(i+1, j-1) + k_4 \cdot s(i-1, j) + k_5 \cdot s(i, j) + k_6 \cdot s(i+1, j) + \\ k_7 \cdot s(i-1, j+1) + k_8 \cdot s(i, j+1) + k_9 \cdot s(i+1, j+1) \quad (1)$$

$$r(i+1, j) = k_1 \cdot s(i, j-1) + k_2 \cdot s(i+1, j-1) + \\ k_3 \cdot s(i+2, j-1) + k_4 \cdot s(i, j) + k_5 \cdot s(i+1, j) + k_6 \cdot s(i+2, j) + \\ k_7 \cdot s(i, j+1) + k_8 \cdot s(i+1, j+1) + k_9 \cdot s(i+2, j+1) \quad (2)$$

$$r(i+2, j) = k_1 \cdot s(i+1, j-1) + k_2 \cdot s(i+2, j-1) + \\ k_3 \cdot s(i+3, j-1) + k_4 \cdot s(i+1, j) + k_5 \cdot s(i+2, j) + k_6 \cdot s(i+3, j) + \\ k_7 \cdot s(i+1, j+1) + k_8 \cdot s(i+2, j+1) + k_9 \cdot s(i+3, j+1) \quad (3)$$

$$r(i+3, j) = k_1 \cdot s(i+2, j-1) + k_2 \cdot s(i+3, j-1) + \\ k_3 \cdot s(i+4, j-1) + k_4 \cdot s(i+2, j) + k_5 \cdot s(i+3, j) + k_6 \cdot s(i+4, j) + \\ k_7 \cdot s(i+2, j+1) + k_8 \cdot s(i+3, j+1) + k_9 \cdot s(i+4, j+1) \quad (4)$$

$$r(i+4, j) = k_1 \cdot s(i+3, j-1) + k_2 \cdot s(i+4, j-1) + \\ k_3 \cdot s(i+5, j-1) + k_4 \cdot s(i+3, j) + k_5 \cdot s(i+4, j) + k_6 \cdot s(i+5, j) + \\ k_7 \cdot s(i+3, j+1) + k_8 \cdot s(i+4, j+1) + k_9 \cdot s(i+5, j+1) \quad (5)$$

$$r(i+5, j) = k_1 \cdot s(i+4, j-1) + k_2 \cdot s(i+5, j-1) + \\ k_3 \cdot s(i+6, j-1) + k_4 \cdot s(i+4, j) + k_5 \cdot s(i+5, j) + k_6 \cdot s(i+6, j) + \\ k_7 \cdot s(i+4, j+1) + k_8 \cdot s(i+5, j+1) + k_9 \cdot s(i+6, j+1) \quad (6)$$

$$r(i+6, j) = k_1 \cdot s(i+5, j-1) + k_2 \cdot s(i+6, j-1) + \\ k_3 \cdot s(i+7, j-1) + k_4 \cdot s(i+5, j) + k_5 \cdot s(i+6, j) + k_6 \cdot s(i+7, j) + \\ k_7 \cdot s(i+5, j+1) + k_8 \cdot s(i+6, j+1) + k_9 \cdot s(i+7, j+1) \quad (7)$$

$$r(i+7, j) = k_1 \cdot s(i+6, j-1) + k_2 \cdot s(i+7, j-1) + \\ k_3 \cdot s(i+8, j-1) + k_4 \cdot s(i+6, j) + k_5 \cdot s(i+7, j) + k_6 \cdot s(i+8, j) + \\ k_7 \cdot s(i+6, j+1) + k_8 \cdot s(i+7, j+1) + k_9 \cdot s(i+8, j+1) \quad (8)$$

Figure 5A:
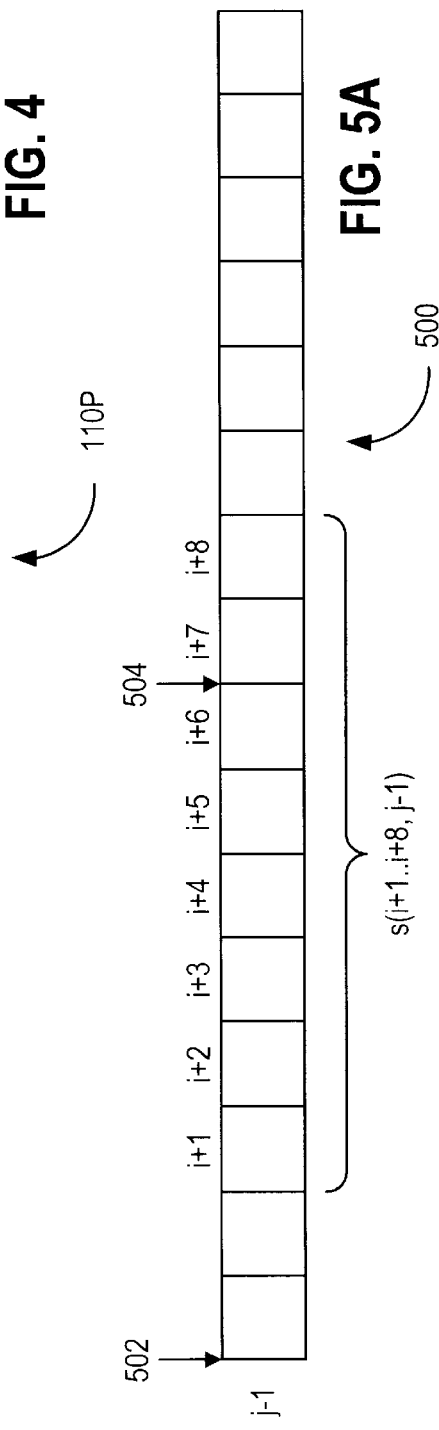
FIGS. 5A and 5B are diagrams of a sixteen-byte stream of pixel data and illustrate the alignment of pixel data with an eight-byte boundary.
Figure 5B:
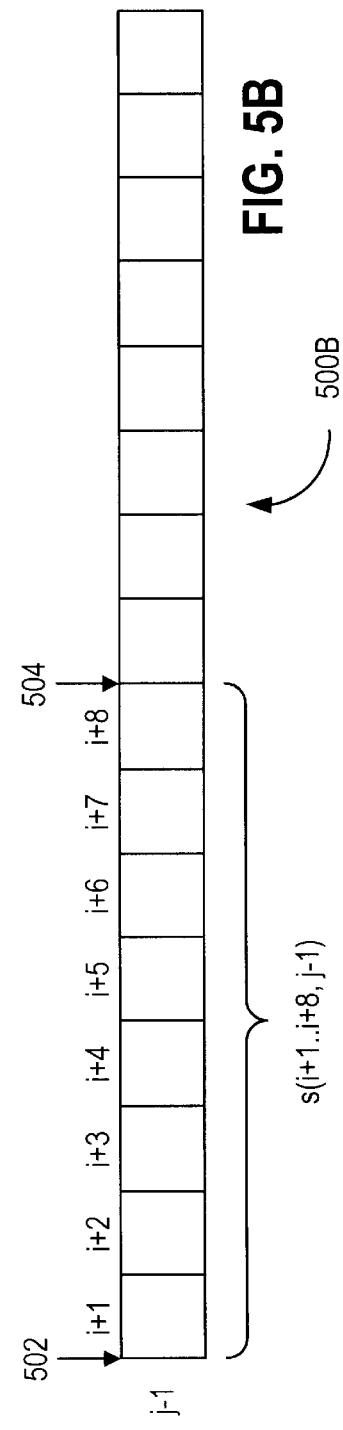

It can be seen from equations (1)–(8) that each coefficient of convolution matrix 114 is multiplied by eight pixels. For example, coefficient $k_3$ is multiplied by pixels s(i+1,j−1), s(i+2,j−1), s(i+3,j−1), s(i+4,j−1), s(i+5,j−1), s(i+6,j−1), s(i+7,j−1), and s(i+8,j−1). Image processor 130 multiplies each coefficient by eight pixels of patch 110P two partitioned multiplication operations performed by processor 102, each of which multiplies a coefficient by four pixels of patch 110P simultaneously and in parallel. Prior to performing the partitioned multiplication operations, image processor 102 must generally read from memory 104 and align eight pixels In response to computer instructions of image processor 130, processor 102 retrieves sixteen (16) contiguous pixels, e.g., sixteen pixel stream 500 (FIG. 5A) from source image 110 (FIG. 2) which are aligned with an eight-byte boundary, e.g., eight-byte boundary 502. An eight-byte boundary is an address of memory 104 which is an integer multiple of eight. As shown in FIG. 5A, pixels s(i+1..i+8,j−1) are offset from eight-byte boundary 502 by two bytes. Image processor 130 aligns sixteen pixel stream 500 by shifting sixteen pixel stream 500 to the left by two bytes to produce a sixteen pixel stream 500B (FIG. 5B) in which the eight pixels s(i+1..i+8,j−1) are aligned with eight-byte boundary 502. Once the pixels are read from memory 104 and are aligned, image processor 130 performs partitioned multiplication and partitioned addition operations within processor 102 in accordance with equations (1) as described more completely below to produce eight pixels of resulting image 112 simultaneously and in parallel.

In conventional convolution systems implemented using a parallel processor which is capable of partitioned arithmetic operations, redundant retrieval of pixel data from source image 110 and redundant alignment of such pixel data are avoided by convolving pixels of source image 110 in a direction transverse to the primary index of source image 110, i.e., in the direction of the secondary index of source image 110. For example, after convolving patch 110P of pixels s(i−1..i+8,j−1..j+1) to produce pixels r(i..i+7,j), such a conventional system would convolve a patch of pixel data of source image 110 which is offset from patch 110P by one increment in the secondary index, i.e., a patch of pixels s(i−1..i+8,j..j+2). In most graphical display systems in use today, such a subsequent patch is in vertical alignment with patch 110P and is offset from patch 110P by one pixel in the vertical direction. Convolution of a patch of pixels s(i−1..i+8,j..j+2) produces pixels r(i..i+7,j+1) whereas convolution of patch 110P of pixels s(i−1..i+8,j−1..j+1) produces pixels r(i..i+7,j). By doing so, pixel data stored within source image 110 at a location having a secondary index of j or j+1 have already been read and aligned by the processor. Thus, redundant reading and alignment of pixel data is obviated by such a conventional convolution implementation using a parallel processor.

However, such conventional convolution systems suffer from the inefficiency of a cache miss during reading of pixel data from a location within source image 110 having a secondary index of j+2 in the subsequent convolution. Pixel s(i,j+2) is displaced from pixel s(i,j+1) in source image 110 within memory 104 by approximately n pixels, where n is the number of pixels in the direction of the primary index, e.g., where n is the width of source image 110. As a result, the processor must typically retrieve pixel data from memory rather than from cache memory each time another patch of source image 110 is convolved to produce eight bytes of pixel data in resulting image 112.

Figure 6:
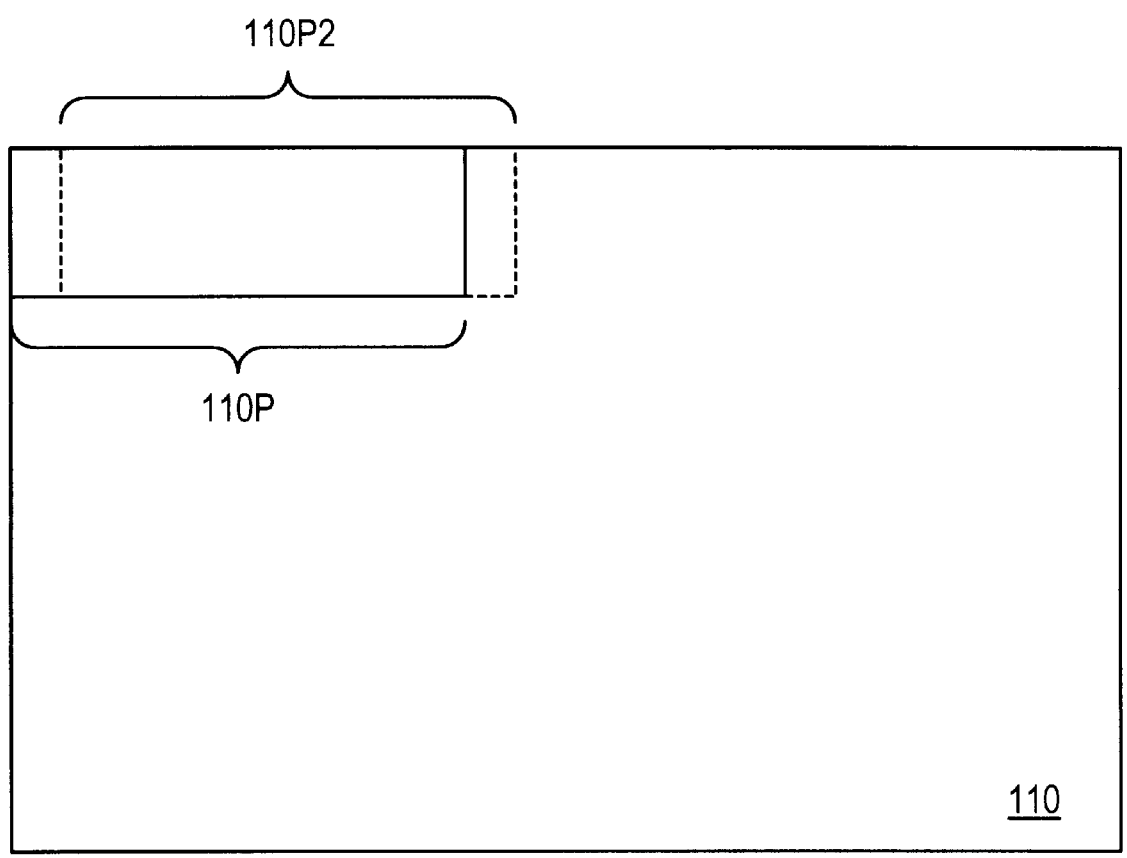
FIG. 6 is a diagram showing the relation to the source image of FIGS. 1 and 2 of the patch of FIG. 4 and a subsequently retrieved patch of pixel data.

In accordance with the present invention, following convolution of patch 110P, which includes pixels s(i−1..i+8,j−1..j+1), to produce eight pixels s(i..i+7,j), image processor 130 retrieves a patch 110P2 (FIG. 6) of pixel data from source image 110 which is offset from patch 110P by one increment in the direction of the primary index of source image 110. Specifically, patch 110P2 includes pixels s(i..i+9,j−1..j+1). Image processor 130 convolves pixel data in patch 110P2 to produce pixels r(i+1..i+8,j). By incrementing the primary index of patch 110P to select subsequent patch 110P2, pixel data corresponding to patch 110P2 can frequently be found in cache memory 120 (FIG. 1) and can therefore be retrieved by processor 102 by a cache hit rather than a cache miss.

For example, if patch 110P includes s(i−1..i+8,j), patch 110P2 includes s(i..i+9,j) and, in particular, includes s(i+9,j) which is not included in patch 110P. Since patch 110P2 is offset by one increment in the primary index, s(i+9,j) is adjacent to s(i+8,j) in memory 104. In one embodiment, cache memory 120, in response to a cache miss, retrieves from memory 104 and stores 64 contiguous bytes of data, which is generally referred to as a cache line. Therefore, s(i+9,j) will frequently be found in cache memory 120 and result in a cache hit when retrieved. Generally, in convolving source image 110, retrieval of pixel data results in a cache miss approximately once on average during convolution of each 64 pixels of source image 110.

Such is true even when considering instances in which the end of source image 110 in the direction of the primary index is reached. Specifically, when the primary index is incremented to its maximum value, e.g., when the entire width of source image 110 has been convolved, the primary index is reset and the secondary index is incremented in a manner described more completely below. Most commonly, source image 110 is a rectangular image, the primary index is horizontal and increases from left to right, and the secondary index is vertical and increases from top to bottom. In such a source image, when a horizontal line of pixels of the source image have been convolved such that the right edge of the source image is reached, the next pixel to be convolved is the leftmost pixel of the horizontal line of pixels immediately below the horiztontal line of pixels most recently convolved. As described above, each horizontal line of source image 110 is stored as a contiguous sequence of pixel data and the contiguous horizontal lines are stored substantially contiguously end-to-end such that the last pixel of a horizontal line is substantially immediately followed by the first pixel of the next horizontal line with perhaps only a few bytes of pad data between. Thus, after convolving the last pixel in a line of pixels, the first pixel in the next line of pixels is frequently retrieved from cache memory 120 in a cache hit.

As described above, convolving pixels along the primary index rather than convolving pixels of the source image transverse to the primary index results in redundant reading of and alignment of pixel data. However, novel use of multiple pipelines through a parallel processor, e.g., parallel processor 102, causes substantially simultaneous (i) retrieval of pixel data and (ii) partitioned multiplication and addition operations involving the pixel data to convolve the pixels represented by the pixel data.

Figure 7:
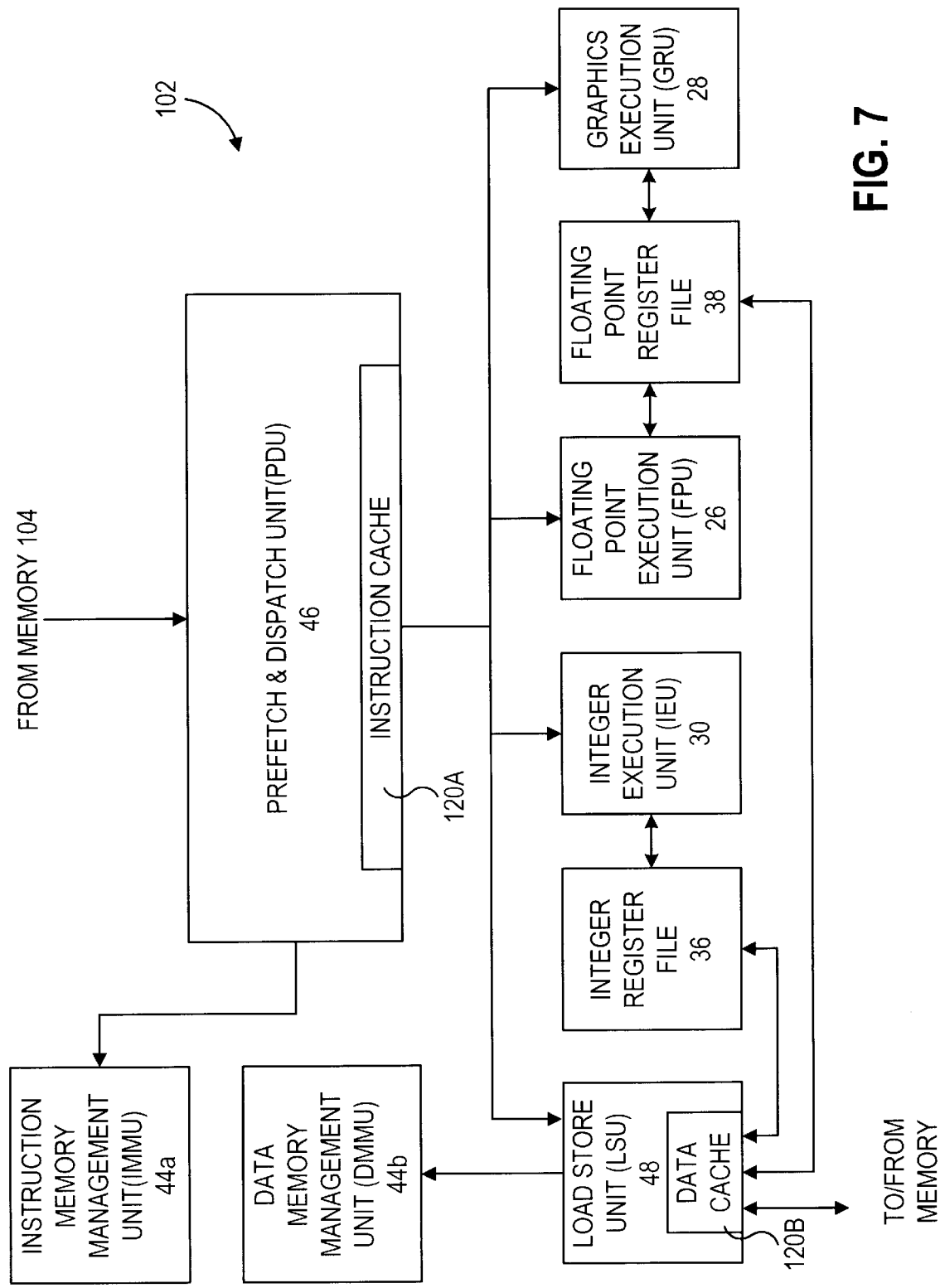
FIG. 7 is a block diagram showing in greater detail the processor of FIG. 1.

To facilitate understanding and appreciation of the present invention, the structure of processor 102 is described more completely. Processor 102 is shown in greater detail in FIG. 7 and is described briefly herein and more completely in U.S. patent application Ser. No. 08/236,572 by Timothy J. Van Hook, Leslie Dean Kohn, and Robert Yung, filed Apr. 29, 1994 and entitled "A Central Processing Unit with Integrated Graphics Functions" (the '572 application) which is incorporated in its entirety herein by reference. Processor 102 includes a prefetch and dispatch unit (PDU) 46, an instruction cache 40, an integer execution unit (IEU) 30, an integer register file 36, a floating point unit (FPU) 26, a floating point register file 38, and a graphics execution unit (GRU) 28, coupled to each other as shown. Additionally, processor 102 includes two memory management units (IMMU & DMMU) 44a–44b, and a load and store unit (LSU) 48, which in turn includes data cache 120B, coupled to each other and the previously described elements as shown. Together, the components of processor 102 fetch, dispatch, execute, and save execution results of computer instructions, e.g., computer instructions of image processor 130, in a pipelined manner.

PDU 46 fetches instructions from memory 104 (FIG. 1) and dispatches the instructions to IEU 30 (FIG. 7), FPU 26, GRU 28, and LSU 48 accordingly. Prefetched instructions are stored in instruction cache 120A. Instruction cache 120A and data cache 120B are collectively cache memory 120 (FIG. 1). IEU 30 (FIG. 7), FPU 26, and GRU 28 perform integer, floating point, and graphics operations, respectively. In general, the integer operands/results are stored in integer register file 36, whereas the floating point and graphics operands/results are stored in floating point register file 38. Additionally, IEU 30 also performs a number of graphics operations, and appends address space identifiers (ASI) to addresses of load/store instructions for LSU 48, identifying the address spaces being accessed. LSU 48 generates addresses for all load and store operations. The LSU 48 also supports a number of load and store operations, specifically designed for graphics data. Memory references are made in virtual addresses. MMUs 44a–44b map virtual addresses to physical addresses.

PDU 46, IEU 30, FPU 26, integer and floating point register files 36 and 38, MMUs 44a–44b, and LSU 48 can be coupled to one another in any of a number of configurations as described more completely in the '572 application.

As described more completely in the '572 application with respect to FIGS. 8a–8d thereof, GRU 28 is an arithmetic processing unit and performs a partitioned multiplication operation and a partitioned addition operation. Performance of the partitioned multiplication operation multiplies each of four partitioned eight-bit unsigned integers in a 32-bit word by an upper or lower partitioned sixteen-bit fixed-point number of a 32-bit word to produce four partitioned sixteen-bit fixed-point products in a 64-bit word. Performance of the partitioned addition operation adds respective partitioned 16-bit fixed-point numbers of two 64-bit words to produce four respective partitioned 16-bit fixed-point sums in a 64-bit word.

As described above, processor 102 includes four (4) separate processing units, i.e., LSU 48, IEU 30, FPU 26, and GRU 28. Each of these processing units is described more completely in the '572 application. These processing units operate in parallel and can each execute a respective computer instruction while others of the processing units execute different computer instructions. GRU 28 executes the partitioned multiplication and partitioned addition operations described above. As described in the '572 application, GRU 28 has two separate execution paths and can execute two instructions simultaneously. GRU 28 can execute a partitioned addition operation while simultaneously executing a partitioned multiplication operation. By pipelining the various operations described above in a manner described more completely below, performance in convolving pixels of source image 110 (FIG. 1) is enhanced.

GRU 28 (FIG. 7) cannot execute more than one partitioned multiplication operation or more than one partitioned addition operation at a time but can perform one partitioned multiplication operation and one partitioned addition operation substantially simultaneously. By appropriately pipelining instructions to achieve such parallelism, processor 102 is more completely used and convolution of source image 110 is performed more efficiently.

Table A shows computer instructions of image processor 130 pipelined so as to achieve the level of parallelism in processor 102 described above. In Table A, processor 102 (FIG. 1), in response to computer instructions fetched from image processor 130 and executed, retrieves from source image 110 a patch of pixels, e.g., patch 110P (FIG. 4), of the dimensions ten (10) pixels in the direction of the primary index and three (3) pixels in the direction of the secondary index. Further in Table A, processor 102 (FIG. 1) convolves those pixels to produce pixels r(i:i+7,j) of resulting image 112.

In instruction cycle 1, IEU 30 (FIG. 7) aligns an address within source image 110 (FIG. 1) of pixels s(i−1..i+6,j−1) to produce an address of a sixteen-byte stream which is aligned on an eight-byte boundary and which includes pixels s(i−1..i+6,j−1). In instruction cycles 2 and 3 of Table A, LSU 48 (FIG. 7) reads the first and second eight bytes, respectively, of the sixteen-byte stream at the address produced in instruction cycle 1. In instruction cycle 4, GRU 28 aligns pixels s(i−1..i+6,j−1) by shifting the sixteen-byte stream until pixel s(i−1,j−1) is represented by the first byte of the sixteen-byte stream, thereby causing the first eight bytes of the sixteen-byte stream to represent pixels s(i−1..i+6, j−1). In instruction cycle 5, IEU 30 aligns an address within source image 110 (FIG. 1) of pixels s(i−1..i+6,j) which are the next pixels to be processed by GRU 28.

Beginning with instruction cycle 6, processor 102 reads a second series of pixel data for eight pixels while simultaneously performing arithmetic operations on the previously read series of pixel data for eight pixels. In instruction cycle 6, GRU 28 of processor 102 performs a partitioned multiplication operation on four bytes of data representing pixels s(i−1..i+2,j−1) by coefficient $k_1$ of convolution matrix 114 (FIG. 3) to produce a 64-bit word of four (4) partitioned sixteen-bit fixed-point products. Specifically, the partitioned products are equal to $k_1 \cdot s(i-1,j-1)$, $k_1 \cdot s(i,j-1)$, $k_1 \cdot s(i+1,j-1)$, and $k_1 \cdot s(i+2,j-1)$, which are the first components of equations (1)–(4), respectively. Coefficient $k_1$ is stored within processor 102 as a sixteen-bit fixed-point number. GRU 28, in instruction cycle 7, adds the partitioned products to a first part of a partitioned running total which is initialized prior to the processing represented in Table A and which includes two parts, each of which is a 64-bit word of four (4) partitioned sixteen-bit fixed-point numbers.

Substantially simultaneously and in a different pipeline through GRU 28, GRU 28 performs a partitioned multiplication operation on four bytes of data representing pixels s(i+3..:i+6,j−1) by coefficient $k_1$ of convolution matrix 114 (FIG. 1) to produce the partitioned products $k_1 \cdot s(i+3,j-1)$, $k_1 \cdot s(i+4,j-1)$, $k_1 \cdot s(i+5,j-1)$, and $k_1 \cdot s(i+6,j-1)$, which are the first components of equations (5)–(8), respectively. In instruction cycle 10, GRU 28 adds the partitioned products produced in instruction cycle 7 to the second part of the partitioned running total. Thus, in instruction cycles 6, 7, and 10, GRU 28 multiplies each of eight bytes by coefficient $k_1$ to produce the first component of equations (1)–(8) and adds the first components of equations (1)–(8) to a partitioned running total.

Substantially simultaneously, in instruction cycles 6 and 7, LSU 48 reads the sixteen-byte stream of pixel data at the aligned address determined in instruction cycle 5. In instruction cycle 8, the sixteen-byte stream of pixel data is aligned by GRU 28 such that the first byte of the sixteen-byte stream represents pixel s(i−1,j). In instruction cycles 10, 11, and 14, GRU 28 processes the first eight bytes of the sixteen-byte stream in a manner that is directly analogous to the processing of GRU 28 in instructions cycles 6, 7, and 10 as described above. The result of processing by GRU 28 in instruction cycles 10, 11, and 14 includes partitioned products of coefficient $k_4$ and each of the bytes of the aligned sixteen-byte stream, i.e., the fourth components of equations (1)–(8) above, and addition of the partitioned products to the partitioned running total.

Each of the nine (9) components of equations (1) through (8) above is produced in an analogous manner using partitioned multiplication and partitioned addition operations and accumulated in the partitioned running total as shown in Table A. Convolution according to the present invention does not suffer from the disadvantage of redundant reading of pixel data of source image 110 (FIG. 1) since processor 102 reads pixel data while processor 102 substantially simultaneously processes previously read and aligned pixel data in different pipelines. As shown in Table A, eight (8) pixels in resulting image 112 are produced by convolution of pixels of source image 110 in 39 instruction cycles, i.e., about five (5) instruction cycles per convolved pixel. Thus, by reading pixel data in a pipeline of a parallel processor while previously read data are substantially simultaneously processed in a different pipeline of the parallel processor achieves a degree of efficiency and speed in convolution never before achieved in the prior art.

Figure 8A:
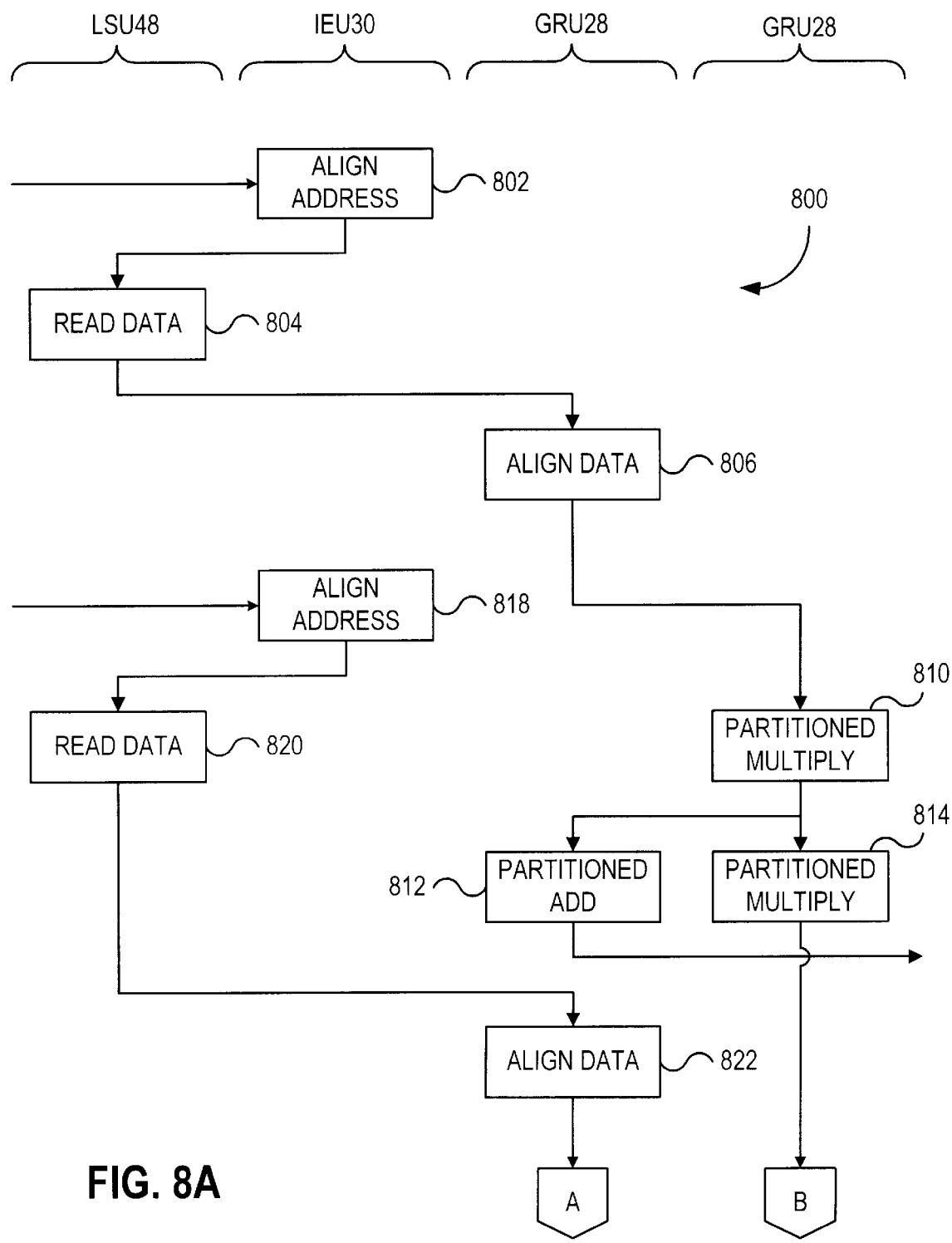
FIGS. 8A and 8B are a logic flow diagram illustrating the convolution of source image pixel data by various pipelines of the processor of FIGS. 1 and 7 in accordance with the present invention.
Figure 8B:
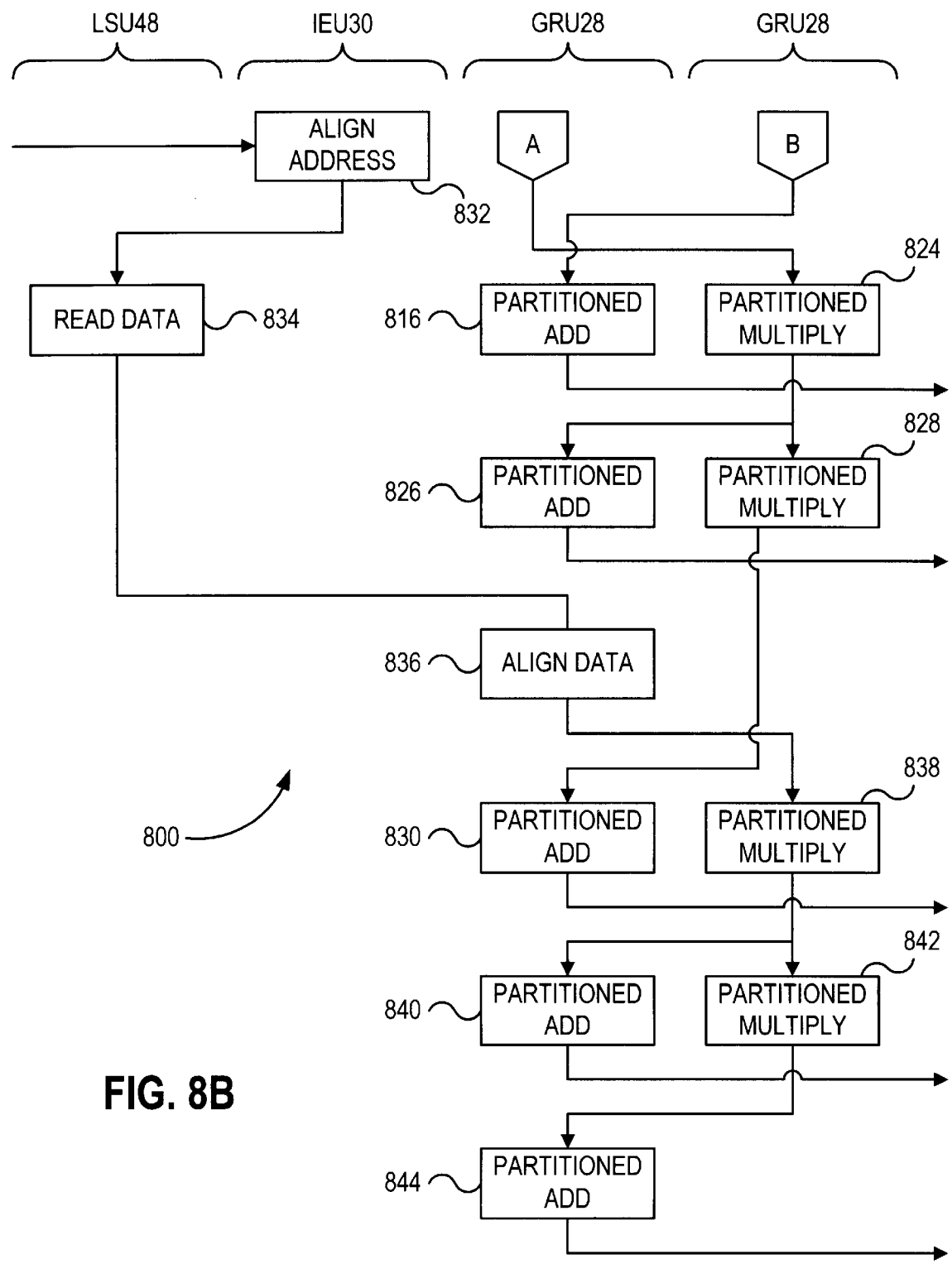

For added clarity, processing by image processor 130 in processor 102 according to Table A is represented in logic flow diagram 800 (FIGS. 8A and 8B). Each column of logic flow diagram 800 represents a pipeline of processor 102 and steps in logic flow diagram 800 which are aligned horizontally are performed substantially simultaneously. In step 802 (FIG. 8A), IEU 30 aligns an address of eight bytes of pixel data with the last preceding eight-byte boundary. Processing transfers to step 804 in which LSU 48 reads a sixteen-byte stream of pixel data as described above. In step 806, to which processing transfers from step 804, GRU 28 aligns the pixel data as described above. Processing transfers from step 806 to step 810 in which GRU 28 performs partitioned multiplication involving the first four bytes of the aligned data. From step 810, processing transfers to steps 812 and 814 which are performed substantially simultaneously and in which respectively GRU 28 performs, in one pipeline, partitioned addition involving the first four bytes of the aligned data and, in another pipeline, partitioned multiplication involving the second four bytes of the aligned data. From step 812, processing of the first four bytes of the data aligned in step 806 terminates. From step 814, processing transfers to step 816 (FIG. 8B) in which GRU 28 performs partitioned addition involving the second four bytes of the data aligned in step 806 (FIG. 8A) and thereafter processing of the second four bytes of data aligned in step 806 terminates.

Prior to step 810, EEU 30 aligns an address of a second collection of eight bytes of pixel data in step 818. In step 820, which is performed substantially simultaneously with step 810, LSU 48 reads a sixteen-byte stream of pixels data at the address aligned in step 818 in the manner described above. Next, GRU 28 aligns the pixel data in step 822 in the manner described above. From step 822, processing transfers to steps 824 (FIG. 8B), 826, 828, and 830 in which GRU 28 performs partitioned multiplication and partitioned addition operations involving the first eight bytes of the data aligned in step 822 in the manner described above with respect to steps 810 (FIG. 8A), 812, 814, and 816. Step 824 is performed by GRU 28 in one pipeline substantially simultaneously with step 816 described above which is performed in the other pipeline of GRU 28. Prior to step 824 FIG. 8B), IEU 30 aligns a third address in the manner described above. Thus, as shown in logic flow diagram 800 and in Table A, processor 102 (FIG. 1) reads and aligns data substantially simultaneously with arithmetic processing of previously read and aligned data.

Figure 9:
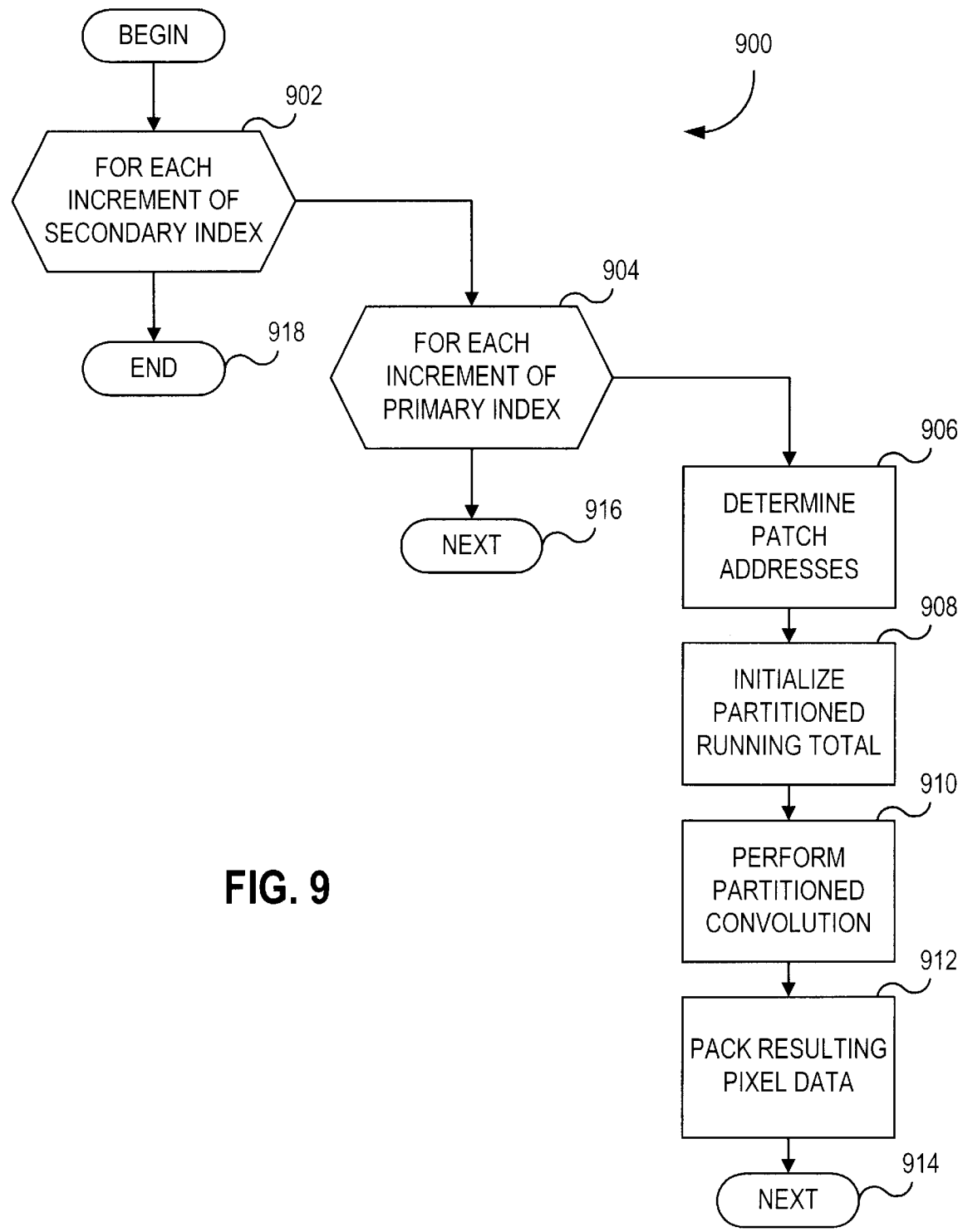
FIG. 9 is a logic flow diagram illustrating the convolution of the source image of FIGS. 1 and 2 in accordance with the present invention.

Convolution of the entirety of source image 110 (FIG. 1) by image processor 130 is shown in logic flow diagram 900 (FIG. 9). Processing begins with loop step 902 which, in conjunction with next step 916, defines a loop in which image processor 130 convolves each line of pixels of source image 110 (FIG. 1) along the direction of the primary index for each increment of the secondary index of source image 110. For example, if source image 110 has m horizontal lines and the secondary index specifies a particular horizontal line, the loop defined by loop step 902 and next step 916 is performed once for each of the m horizontal lines of source image 110. For each of the lines along the direction of the primary index, processing transfers from loop step 902 to loop step 904. During each iteration of the loop defined by loop step 902 and next step 916, the particular line processed is referred to as the secondary index line. Once each of the lines along the direction of the primary index of source image 110 is processed according to the loop defined by loop step 902 and next step 916, processing according to logic flow diagram 900 terminates and convolution of source image 110 to produce resulting image 112 is complete.

Loop step 904, in conjunction with next step 914, defines a loop in which processor 102 convolves each contiguous collection of eight pixels of the secondary index line of source image 110 (FIG. 1). For example, if source image 110 has n pixels in the secondary index line, the loop defined by loop step 904 and next step 914 is performed once for each contiguous collection of eight pixels of the n pixels. For each such contiguous collection of eight pixels, processing transfers from loop step 904 to step 906. During each iteration of the loop defined by loop step 904 and next step 914, the particular eight pixels processed are referred to as the subject eight pixels. Once all of the pixels of the secondary index line are processed according to the loop defined by loop step 904 and next step 914, processing transfers from loop step 904 to next step 916 and the next secondary index line is processed according to the loop defined by loop step 902 and next step 916 as described above.

In step 906, image processor 130 (FIG. 1) determines the starting addresses of patch 110 which must be read from memory 104 to convolve the subject eight pixels. Processing transfers to step 908 (FIG. 9) in which image processor 130 initializes each partitioned sixteen-bit fixed-point number of the partitioned running total which includes eight such partitioned numbers as described above. In one embodiment, each partitioned number of the partitioned running total is initialized to zero. In an alternative embodiment, each partitioned number of the partitioned running total is initialized to 0.5 to round off, rather than truncate, each partitioned running total prior to scaling and packing each partitioned into an eight-bit unsigned integer to form a corresponding pixel of resulting image 112. From step 908 (FIG. 9), processing transfers to step 910 in which image processor 130 (FIG. 1) convolves the eight subject pixels of source image 110 to produce eight convolved pixels of resulting image 112 in accordance with the processing shown in Table A as described above and as shown in part in logic flow diagram 800 (FIGS. 8A and 8B). As a result of processing in accordance with Table A, each of the eight (8) sixteen-bit fixed-point numbers of the partitioned running total contains data representing the solution of equations (1)–(8) above. From step 910 (FIG. 9), processing transfers to step 912 in which image processor 130 (FIG. 1) clips and packs each of the eight (8) partitioned sixteen-bit fixed-point numbers of the running total into a respective byte of resulting image 112 which corresponds to a respective one of the subject eight bytes. In one embodiment, clipping and packing includes execution of a partitioned pack instruction by GRU 28 such that such clipping and packing of four of the partitioned sixteen-bit fixed-point numbers are packed in each of two successive instruction cycles.

From step 912 (FIG. 9), processing transfers to next step 914 in which the next iteration of the loop defined by loop step 904 and next step 914 is performed. As described above, after each pixel of the secondary index line is processed and after each secondary index line is processed, processing according to logic flow diagram 900 terminates and resulting image 112 (FIG. 1) contains the resulting pixel data from convolution of the pixel data of source image 110.

The above description is illustrative only and is not limiting. For example, it is described above that eight pixels of source image 110 are convolved substantially simultaneously to produce eight convolved pixels of resulting image 112. However, it is appreciated that fewer or more pixels of source image 110 can be convolved substantially simultaneously to produce an equal number of convolved pixels of resulting image 112 without deviating from the underlying principles of the foregoing description. In addition, convolution matrix 114 is described as having three columns and three rows of scalar coefficients. However, it is appreciated that the principles described above can be readily adapted to convolve pixels of source image 110 using convolution matrices of different sizes. Furthermore, it is appreciated that arithmetic operations involving operands of precisions and formats other than eight-bit unsigned integer and sixteen-bit fixed-point numbers can be used without deviating substantially from the teachings of the foregoing description. The present invention is limited only by the claims which follow.

TABLE A

| IC | LSU 48 | IEU 30 | GRU 28 | GRU 28 |
|---|---|---|---|---|
| 1 |  | align address for s(i − 1, j − 1): vis_alignaddr() |  |  |
| 2 | read first 8 bytes: din0 = s[0] |  |  |  |
| 3 | read second 8 bytes: din1 = s[1] |  |  |  |
| 4 |  |  | align data: vis_faligndata() |  |
| 5 |  | align address for s(i − 1, j): vis_alignaddr() |  |  |
| 6 | read first 8 bytes: din0 = s[0] |  |  | partitioned mult: tmp0 = $k_1 \cdot s(i − 1 .. i + 2, j − 1)$ |
| 7 | read second 8 bytes: din1 = s[1] |  | partitioned add tmp0 to part 1 of the running total | partitioned mult: tmp1 = $k_1 \cdot s(i + 3 .. i + 6, j − 1)$ |
| 8 |  |  | align data: vis_faligndata() |  |
| 9 |  | align address for s(i − 1, j + 1): vis_alignaddr() |  |  |
| 10 | read frst 8 bytes: din0 = s[0] |  | partitioned add tmp1 to part 2 of the running total | partitioned mult: tmp0 = $k_4 \cdot s(i − 1 .. i + 2, j)$ |
| 11 | read second 8 bytes: din1 = s[1] |  | partitioned add tmp0 to part 1 of the running total | partitioned mult: tmp1 = $k_4 \cdot s(i − 3 .. i + 6, j)$ |
| 12 |  |  | align data: vis_faligndata() |  |
| 13 |  | align address for s(i, j − 1): vis_alignaddr() |  |  |
| 14 | read first 8 bytes: din0 = s[0] |  | partitioned add tmp1 to part 2 of the running total | partitioned mult: tmp0 = $k_7 \cdot s(i − 1 .. i + 2, j + 1)$ |
| 15 | read second 8 bytes: din1 = s[1] |  | partitioned add tmp0 to part 1 of the running total | partitioned mult: tmp1 = $k_7 \cdot s(i − 3 .. i + 6, j + 1)$ |
| 16 |  |  | align data: vis_faligndata() |  |
| 17 |  | align address for s(i, j): vis_alignaddr() |  |  |
| 18 | read first 8 bytes: din0 = s[0] |  | partitioned add tmp1 to part 2 of the running total | partitioned mult: tmp0 = $k_2 \cdot s(i .. i + 3, j − 1)$ |
| 19 | read second 8 bytes: din1 = s[1] |  | partitioned add tmp0 to part 1 of the running total | partitioned mult tmp1 = $k_2 \cdot s(i + 4 .. i + 7, j − 1)$ |
| 20 |  |  | align data: vis_faligndata() |  |
| 21 |  | align address for s(i, j + 1): vis_alignaddr() |  |  |
| 22 | read first 8 bytes: din0 = s[0] |  | partitioned add tmp1 to part 2 of the running total | partitioned mult: tmp0 = $k_5 \cdot s(i .. i + 3, j)$ |
| 23 | read seeond 8 bytes: din1 = s[1] |  | partitioned add tmp0 to part 1 of the running total | partitioned mult: tmp1 = $k_5 \cdot s(i + 4 .. i + 7, j)$ |
| 24 |  |  | align data: vis_faligndata() |  |
| 25 |  | align address for s(i + 1, j − 1): vis_alignaddr() |  |  |
| 26 | read first 8 bytes: din0 = s[0] |  | partitioned add tmp1 to part 2 of the running total | partitioned mult: tmp0 = $k_8 \cdot s(i .. i + 3, j + 1)$ |
| 27 | read second 8 bytes: din1 = s[1] |  | partitioned add tmp0 to part 1 of the running total | partitioned mult: tmp1 = $k_8 \cdot s(i + 4 .. i + 7, j + 1)$ |
| 28 |  |  | align data: vis_faligndata() |  |
| 29 |  | align address for s(i + 1, j): vis_alignaddr() |  |  |
| 30 | read first 8 bytes: din0 = s[0] |  | partitioned add tmp1 to part 2 of the running total | partitioned mult: tmp0 = $k_3 \cdot s(i + 1 .. i + 4, j − 1)$ |
| 31 | read second 8 bytes: din1 = s[1] |  | partitioned add tmp0 to part 1 of the running total | partitioned mult: tmp1 = $k_3 \cdot s(i + 5 .. i + 8, j − 1)$ |
| 32 |  |  | align data: vis_faligndata() |  |
| 33 |  | align address for s(i + 1, j + 1): vis_alignaddr() |  |  |
| 34 | read first 8 bytes: din0 = s[0] |  | partitioned add tmp1 to part 2 of the running total | partitioned mult: tmp0 = $k_6 \cdot s(i + 1 .. i + 4, j)$ |
| 35 | read second 8 bytes: din1 = s[1] |  | partitioned add tmp0 to part 1 of the running total | partitioned mult: tmp1 = $k_6 \cdot s(i + 5 .. i + 8, j)$ |

TABLE A-continued

| IC LSU 48 | IEU 30 | GRU 28 | GRU 28 |
|---|---|---|---|
| 36 | | align data: vis_faligndata() | |
| 37 | | partitioned add tmp1 to part 2 of the running total | partitioned mult: tmp0 = $k_9 \cdot s(i + 1 .. i + 4, j - 1)$ |
| 38 | | partitioned add tmp0 to part 1 of the running total | partitioned mult: tmp1 = $k_9 \cdot s(i + 5 .. i + 8, j - 1)$ |
| 39 | | partitioned add tmp1 to part 2 of the running total | |

What is claimed is:

1. A method for convolving pixzels represented by pixel data of a source image in a computer readable memory using a computer processor which includes (i) a load and store unit which includes a load and store pipeline in which data are loaded from and stored to the computer readable memory and (ii) an arithmetic processing unit which includes one or more arithmetic processing pipelines in which arithmetic operations are performed on data, the method comprising:

convolving previously read pixel data of the source image in the arithmetic processing unit; and substantially simultaneously reading subsequent pixel data of the source image in the load and store unit;

convolving a first patch of pixel data which includes the previously read pixel data and the subsequent pixel data and which has a first range in a primary index and a second range in a secondary index; and substantially immediately thereafter convolving a second patch of pixel data which has a third range in the primary index, which in turn is incremented from the first range, and a fourth range in the secondary index, which in turn is equal to the second range.

2. A method for convolving pixels represented by pixel data of a source image in a computer readable memory using a computer processor which includes (i) a load and store unit which includes a load and store pipeline in which data are loaded from and stored to the computer readable memory and (ii) an arithmetic processing unit which includes one or more arithmetic processing pipelines in which arithmetic operations are performed on data, the method comprising:

convolving previously read pixel data of the source image in the arithmetic processing unit; and substantially simultaneously reading subsequent pixel data of the source image in the load and store unit;

wherein the step of convolving comprises:

multiplying in a first pipeline of the arithmetic processing unit a first portion of the previously read pixel data by a coefficient; and substantially simultaneously with the step of multiplying, accumulating by performance of an addition operation in a second pipeline of the arithmetic processing unit previously produced products of the coefficient and a second portion of the previously read pixel data.

3. The method of claim 2 wherein the first portion comprises a partitioned data word representing two or more pixels; and further wherein the step of multiplying comprises multiplying each partitioned portion of the partitioned word by the coefficient substantially simultaneously.

4. The method of claim 2 wherein the previously produced products of the coefficient and the second portion comprises a partitioned data word which includes two or more partitioned products; and further wherein the step of accumulating comprises accumulating each partitioned product substantially simultaneously.

5. A computer program product including a computer usable medium having computable readable code embodied therein for causing convolution of pixels in a computer processor which includes a load and store unit and an arithmetic processing unit, wherein the computer readable code comprises:

(a) computer readable program code devices configured to cause the arithmetic processing unit to convolve previously read pixel data; and (b) computer readable program code devices configured to cause the load and store unit to substantially simultaneously read subsequent pixel data;

(c) computer readable program code configured to convolve a first patch of pixel data which includes the previously read pixel data and the subsequent pixel data and which has a first range in a primary index and a second range in a secondary index; and (d) computer readable program code configured to substantially immediately thereafter convolve a second patch of pixel data which has a third range in the primary index, which in turn is incremented from the first range, and a fourth range in the secondary index, which in turn is equal to the second range.

6. A computer program product including a computer usable medium having computable readable code embodied therein for causing convolution of pixels in a computer processor which includes a load and store unit and an arithmetic processing unit, wherein the computer readable code comprises:

(a) computer readable program code devices configured to cause the arithmetic processing unit to convolve previously read pixel data; and (b) computer readable program code devices configured to cause the load and store unit to substantially simultaneously read subsequent pixel data;

wherein computer readable program code (a) comprises:

(i) computer readable program code configured to multiply in a first pipeline of the arithmetic processing unit a first portion of the previously read pixel data by a coefficient; and (ii) computer readable program code configured to accumulate, substantially simultaneously with the multiplying of computer readable program code (i), by performance of an addition operation in a second pipeline of the arithmetic processing unit previously produced products of the coefficient and a second portion of the previously read pixel data.

7. The computer program product of claim 6 wherein the first portion comprises a partitioned data word representing two or more pixels; and further wherein computer readable program code (a)(i) comprises computer readable program code configured to multiply each partitioned portion of the partitioned word by the coefficient substantially simultaneously.

8. The computer program product of claim 6 wherein the previously produced products of the coefficient and the second portion comprises a partitioned data word which includes two or more partitioned products; and further wherein computer readable program code (a)(ii) comprises computer readable program code configured to accumulate each partitioned product substantially simultaneously.

9. An image processor comprising:

a convolution module configured to convolve previously read pixel data in an arithmetic processing unit of a computer processor; and a data loading module which is operatively coupled to the convolution module and which is configured to read subsequent pixel data in a load and store unit of the computer processor substantially simultaneously with the convolution of the previously read pixel data;

a next patch selector which is operatively coupled to the convolution module and which is configured to provide, substantially immediately following convolution by the convolution module of a first patch of pixel data which includes the previously read pixel data and the subsequent pixel data and which has a first range in a primary index and a second range in a secondary index, to the convolution module for convolution a second patch of pixel data which has a third range in the primary index, which in turn is incremented from the first range, and which has a fourth range in the secondary index, which in turn is equal to the second range.

10. An image processor comprising:

a convolution module configured to convolve previously read pixel data in an arithmetic processing unit of a computer processor; and a data loading module which is operatively coupled to the convolution module and which is configured to read subsequent pixel data in a load and store unit of the computer processor substantially simultaneously with the convolution of the previously read pixel data;

wherein the convolution module comprises:

a multiplication module configured to multiply in a first pipeline of the arithmetic processing unit a first portion of the previously read pixel data by a coefficient; and an accumulation module which is operatively coupled to the multiplication module and which is configured to accumulate by performance of an addition operation in a second pipeline of the arithmetic processing unit previously produced products of the coefficient and a second portion of the previously read pixel data;

wherein the multiplication module and the accumulation module are configured to operate substantially simultaneously.

11. The image processor of claim 10 wherein the first portion comprises a partitioned data word representing two or more pixels; and further wherein the multiplication module comprises a partitioned multiplication module configured to multiply each partitioned portion of the partitioned word by the coefficient substantially simultaneously.

12. The image processor of claim 10 wherein the previously produced products of the coefficient and the second portion comprises a partitioned data word which includes two or more partitioned products; and further wherein the accumulation module comprises a partitioned accumulation module configured to accumulate each partitioned product substantially simultaneously.

13. A computer system comprising:

a computer processor which includes:

a load and store unit; and an arithmetic processing unit, operatively coupled to the load and store unit;

a convolution module, which is operatively coupled to the arithmetic processing unit and which is configured to convolve previously read pixel data in an arithmetic processing unit of a computer processor; and a data loading module, which is operatively coupled to the convolution module and to the load and store unit and which is configured to read subsequent pixel data in a load and store unit of the computer processor substantially simultaneously with the convolution of the previously read pixel data, a next patch selector which is operatively coupled to the convolution module and which is configured to, substantially immediately following convolution by the convolution module of a first patch of pixel data which includes the previously read pixel data and the subsequent pixel data and which has a first range in a primary index and a second range in a secondary index, provide to the convolution module for convolution a second patch of pixel data which has a third range in the primary index, which in turn is incremented from the first range, and which has a fourth range in the secondary index, which in turn is equal to the second range.

14. A computer system comprising:

a computer processor which includes:

a load and store unit; and an arithmetic processing unit, operatively coupled to the load and store unit;

a convolution module, which is operatively coupled to the arithmetic processing unit and which is configured to convolve previously read pixel data in an arithmetic processing unit of a computer processor; and a data loading module, which is operatively coupled to the convolution module and to the load and store unit and which is configured to read subsequent pixel data in a load and store unit of the computer processor substantially simultaneously with the convolution of the previously read pixel data;

wherein the convolution module comprises:

a multiplication module configured to multiply in a first pipeline of the arithmetic processing unit a first portion of the previously read pixel data by a coefficient; and an accumulation module which is operatively coupled to the multiplication module and which is configured to accumulate, by performance of an addition operation in a second pipeline of the arithmetic processing unit, previously produced products of the coefficient and a second portion of the previously read pixel data;

wherein the multiplication module and the accumulation module are configured to operate substantially simultaneously.

15. The computer system of claim 14 wherein the first portion comprises a partitioned data word representing two or more pixels; and further wherein the multiplication module comprises a partitioned multiplication module configured to multiply each partitioned portion of the partitioned word by the coefficient substantially simultaneously.

16. The computer system of claim 14 wherein the previously produced products of the coefficient and the second portion comprises a partitioned data word which includes two or more partitioned products; and further wherein the accumulation module comprises a partitioned accumulation module configured to accumulate each partitioned product substantially simultaneously.

17. The method of claim 1 wherein the primary index specifies particular column of the source image.

* * * * *